Jan. 9, 1945. T. R. GRIFFITH 2,366,895
COMPOSITE ARTICLE AND PROCESS OF MAKING SAME
Filed Aug. 30, 1939
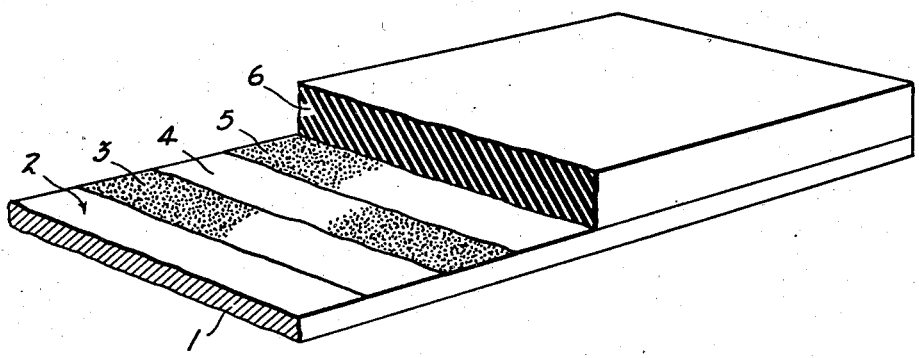
INVENTOR
*Thomas R. Griffith*
BY
*Evans & McCoy*
ATTORNEYS Patented Jan. 9, 1945

2,366,895

UNITED STATES PATENT OFFICE 2,366,895

COMPOSITE ARTICLE AND PROCESS OF MAKING SAME

Thomas Raymond Griffith, Ottawa, Ontario, Canada, assignor to The Honorary Advisory Council for Scientific and Industrial Research, Ottawa, Ontario, Canada, a corporation of Canada Application August 30, 1939, Serial No. 292,700

14 Claims. (Cl. 154—2)

This invention relates to a process of bonding materials together and particularly to the manufacture of composite articles of rubber and metal, leather, wood, fabrics and like materials.

Composite articles of rubber and metal have heretofore been produced by vulcanizing suitably compounded rubber in a mold in contact with metal coated with hydrocarbon rubber conversion products. The hydrocarbon rubber conversion products heretofore used for such bonding have not been entirely satisfactory, however, for the reason that these products are more plastic than rubber at elevated temperatures, and the composite articles cannot therefore be used safely for articles to be in service at elevated temperatures.

In the manufacture of composite articles in which rubber is vulcanized to a material such as metal, the use of such thermoplastic adhesives has required that the mold be cooled before the rubber and metal assembly may be removed from the mold.

It is therefore an object of this invention to provide a simplified method for firmly uniting rubber to metal and other materials wherein the assembly may be removed hot from the mold without substantially impairing the strength of the bond.

It is another object of this invention to provide a composite article of rubber and metal wherein the rubber is firmly bonded to the metal with an adhesive having less plasticity than unvulcanized rubber at elevated temperatures.

It is another object of this invention to provide composite articles and a method of making such articles, in which the component parts of the articles are bonded together with bonds of relatively great strength.

It is a still further object of this invention to provide a method of making composite articles wherein a very strong bond between rubber and metal may be readily secured.

It is a still further object of this invention to provide a method of making composite articles of rubber and metal wherein a solution of the adhesive material is applied to the metal, dried and rubber vulcanized thereto without polymerizing the adhesive on the metal before the rubber is applied.

The improved rubber conversion product used as an adhesive in preparing composite articles of this invention may be made by milling suitable conversion reagents into rubber such as Hevea smoked sheet, or pale crepe, sheeting the product into relatively thin sheets, heating the sheets under suitably controlled conditions until the desired reaction occurs, and then masticating the product to render it soluble in rubber solvents.

The properties of the rubber conversion product produced depend to a large extent on the reagent used in its formation, certain reagents giving adhesives having considerably improved properties. Conversion reagents which in general have been found to give products with good properties may be mixtures of one or more salts of a strong acid in conjunction with a weakly acidic substance. It is thought that these conversion reagents have a polymerizing action on rubber under proper conditions and reduce the number of double bonds. The character of the product seems to be improved when both of the ingredients of the conversion reagent are solids and is further improved when one or more of the solid substances contains considerable water of crystallization. The sulfates, and, in particular, the acid sulfates or double sulfates are preferred, especially when they contain considerable water of hydration. For best results, these materials are used with a suitable cooperating ingredient, such as a weakly acidic substance or a material such as $P_2O_5$ or $PCl_5$, which with water forms a weak acid. Aluminum acid sulfate, when properly used with a cooperating material of the character of phosphoric acid, produces rubber reaction products having exceptionally desirable properties for use both as an adhesive and as a basis for paints.

Examples of the acid sulfates or double sulfates which are particularly desirable for use are those of aluminum, iron (both ferric and ferrous), the alkali metals including ammonia, alkaline earth metals and the closely related alums, potassium alum and other alums. In addition to the acid sulfates, certain sulfates may be used advantageously. Examples of these are sulfates of aluminum, iron (both ferric and ferrous), copper, mercury, and cadmium. Examples of salts of strong acids other than sulphuric acid are bromides of mercury and zinc, chlorides of mercury, tin and aluminum, and alkali metal iodides. Phosphoric acid is a very good example of a weakly acidic substance desirable for use in forming the rubber conversion product hereinbefore mentioned. For some uses, where it is desirable to have the conversion product somewhat more soluble in rubber solvents, oxalic acid has been used advantageously. Other weak acids that are also desirable for use are benzoic, tartaric, phthalic and salicylic. The particular acid may be selected for the properties it gives to the conversion product, as various acids seem to impart slightly different properties.

These weakly acidic materials, while assisting in the formation of the rubber derivatives, are not absolutely essential ingredients of the conversion reagents, and may, in some cases, be omitted. The quantity of salts of strong acids required to convert the rubber into the derivative is, however, much larger when the weakly acidic compound is omitted as a part of the conversion reagent. Thus, the rubber derivative may be prepared by using aluminum acid sulfate alone as the conversion reagent, but its properties as an adhesive are improved and the quantity of reagents required is decreased when phosphoric acid or other weak acid is also present.

In the preparation of the conversion products, the conversion reagent is milled or otherwise suitably mixed with the rubber, until it is thoroughly incorporated. It has been found that the amount and the conditions of mastication have a marked influence on the character of the conversion product produced. Adhesives of greater strength are produced, with given reagents, when the amount of mastication is reduced to a minimum. Mastication in the presence of an acid such as sulfuric, sulfurous, sulfonic, etc., is particularly harmful. Conversion reagents of a solid nature are, therefore, preferred both because they may be quickly incorporated with a minimum of milling, and the mastication of the rubber in the presence of such ingredients is less harmful to the character of the conversion product.

Preferably, there should be present in the mix from 1.5 to 15% of water, including any water of crystallization that may be present. The amount of water may vary outside of and beyond these limits for the production of materials with desired specific properties but usually in the production of adhesives 3% to about 9 or 10% of water should be present in the mix. Ordinarily some free water is added during the mixing to bring the total quantity within this value.

Since water may be milled into the rubber more rapidly than liquid acids and the water and solid anhydride of a weak acid produces less deleterious effects on the rubber than liquid acids, it will be seen that it is advantageous to utilize a solid acid anhydride and water instead of liquid acids. Phosphoric acid is an example of the acid constituent of the reagent preferably used and it is desirable to mix its solid anhydride ($P_2O_5$) into the rubber and then add any water desired.

The mixed product is preferably formed into relatively thin sheets, of an appropriate thickness of about 2 or 3 mm. or so, which are placed in an oven with temperature control and heated for an appropriate period. The temperature and time of heating greatly affect the character of the reaction product. During the heating an exothermal reaction occurs and if the temperature of the sheets rises too high the adhesive quality of the product will be weaker at elevated temperatures. The temperature in the sheets should not rise substantially higher than about 170° C. and superior products are obtained when the temperature remains considerably below this value. Preferably the oven temperature should not be higher than about 140 to 155° C. The control of temperature is aided by the use of thin sheets having a thickness of about 2 or 3 mm. or even less. Also, the evaporation of the water contained in the sheets serves to keep the temperature down. If desired, an inert gas or air may be circulated over the sheeted material in the oven.

It is preferred, however, to heat the mix in an atmosphere having less oxygen pressure than the partial pressure of oxygen in air such as is obtained with an inert gas or in a vacuum. Ordinarily a relatively high vacuum, such as about 500 mm. or more, of mercury is preferred. By carrying out the reaction in a vacuum or an inert gas, the tendency for portions of the thin sheets to become harder than others is substantially eliminated, and a more uniform product is obtained.

The formation of the mix into thin sheets such as 1 to 5 mm. or preferably 2 to 3 mm. or so, is beneficial regardless of the conversion reagent used, and is also important in facilitating the reaction, it being found that the reaction takes place with difficulty and higher maximum temperatures are attained in portions of a mixture when relatively thick sheets are used. When thicker sheets, such as those 5 to 10 mm. thick, are used, any water that is present tends to delay the reaction and a more undesirable product for many purposes results. In thick sheets with no water present, the temperature goes so high in the reaction that the product is not of practical value as an adhesive.

By the use of very thin sheets, such as 1 mm. or so in thickness, it is possible to carry on the reaction at temperatures as low as 100° C. to 105° C., and a derivative having higher molecular weight is produced, which is relatively less soluble and relatively more elastic at elevated temperatures. The use of conversion reagents which are solid, or volatilize with difficulty, is advantageous in carrying out the reaction when the material is in the form of thin sheets. When readily volatile reagents are used and the mix is sheeted into thin sheets, sufficient of the reagent or reagents may be volatilized so that the reaction is incomplete even in the middle of the sheet.

The sheeted material is heated for a sufficient time to allow the reaction to progress to the desired stage. A somewhat harder product is produced by increasing the quantity of conversion reagent, or by heating a given mixture for a longer period of time. After heating, the material is substantially insoluble in rubber solvents, but solubility may be restored by masticating the material for a sufficient time on a rubber mill or in a suitable mixer.

Solubility of the product depends to a large extent on the amount of mastication and for the production of adhesives such as are desired for bonding rubber to metal, the mastication of the reaction product should preferably be reduced to the minimum required for solubility. Working or mastication of the reaction product has a more harmful effect on the strength of the adhesive when acids are present and it is, therefore, preferable to incorporate a basic material into the product as soon as possible during this mastication period to neutralize any acids or acidic substance that might be present or formed during the reaction. In the making of a conversion product for use as an adhesive, an alkali such as NaOH may be used if desired, and the soluble salts removed with water, but it is usually preferable to add basic materials such as oxides or carbonates of zinc, magnesium, etc., which neutralize acids and may be left in the product.

The conversion product used for the making of adhesives should contain powdered solids such as zinc oxide, or finely divided fibrous materials, such as short fiber asbestos. These materials may be added to the conversion product as it is being reworked or remasticated. These materials have the effect of improving the stiffness of the adhesive at low elongations and they, therefore, improve the strength of the bond when the solution of the conversion product is used as an adhesive for bonding rubber to metal, etc.

The quantity of conversion reagent used in forming the rubber conversion product is dependent on the character of the conversion product desired and the conversion reagent used. Larger quantities of conversion reagent, such as aluminum acid sulfate with phosphoric acid, give harder products when heated for a given length of time. When a weakly acidic compound is not present, a larger quantity of the acid salt of strong acid must be used to produce conversion products of the same hardness. This may amount to 50% or more of the rubber mixture. When a weak acid, such as phosphoric, is also present, the total of both ingredients of the conversion reagent may, in some cases be less than 10% of the rubber mixture.

The characteristics of the derivatives produced are also somewhat dependeint on the rubber used as a starting material, and the strongest adhesive is produced from rubber such as pale crepe, smoked sheet, etc. Masticated rubber may, however, be used as a basis for preparation of the derivative, but it is desirable that the amount of mastification be kept at a minimum for the making of adhesives. Other rubberlike materials, such as reclaim rubber and African or Congo rubber, may be used for the production of rubber derivatives of the type herein disclosed.

In the preparation of composite articles the rubber conversion products are preferably used in solution as an adhesive. If one or more of the members of the composite article is sufficiently porous to permit the escape of solvent or is capable of absorbing the solvent, the composite article may be prepared by simply coating one or both of the surfaces, which are to be adjacent to each other, with a solution of the adhesive, then placing both surfaces together whereby they are in contact with the liquid adhesive, and permitting the adhesive to dry while the surfaces are in contact. If neither of the materials is sufficiently porous or absorbent to permit the escape of solvent, the adhesive coating on one or more of the surfaces should be allowed to dry before assembly and the composite article may be completed by the application of heat and pressure. In the production of composite articles of rubber and metal, the metal is preferably coated with one or more coats of a suitable solution of the rubber conversion reagent, each coat being allowed to dry before another is applied. The rubber is then superimposed on the surface coated with adhesive and heated or vulcanized. The rubber may be vulcanized on the metal in a mold or subjected to heat outside of a mold. If the assembly is heated in a mold to vulcanize the rubber, the assembly may be removed from the mold without cooling the mold.

It has been found that a superior union or bond between a hard and soft material, such as metal and rubber, is produced when a plurality of layers of conversion products, prepared in accordance with this invention, are used between the rubber and metal. The adhesion is improved when one or more layers adjacent the surface of the metal is harder than one or more layers adjacent the rubber. The adhesive may be applied in layer which are each progressively softer from the metal to the rubber, or one or more layers of the same or practically the same hardness may be applied before applying a layer or two of the adhesive of a different hardness.

However, in bonding rubber to metal with various rubber and metal adhesives it is not always beneficial to use layers of successively softer rubber adhesives. For example, if the adhesive has a molecular structure that is considerably broken down, due to the reagents used or the process of preparing the adhesive, the use of several coatings of decreasing hardness does not have the effect of improving the strength of the bond.

The strength of the bond between rubber and metal, obtainable when using the rubber conversion products of this invention, may be further increased when suitable short fibers or powdered solids are incorporated in the adhesive. Examples of such materials are short fiber asbestos, carbon black, oxides, or carbonates of zinc, magnesium, and the like.

The preparation of adhesives for bonding rubber to metal is illustrated by the following examples, in which the parts are by weight:

Example 1

| | |
|---|---|
| Crude rubber (high grade) | 100 |
| Phosphorous pentoxide ($P_2O_5$) | 4.5 |
| Acidified aluminum sulfate ($Al_2(SO_4)_3.H_2SO_4.3H_2O + Al_2(SO_4)_3.18H_2O$) | 18 |
| Water | 1.2 |

These ingredients were thoroughly mixed together on a rubber mill, and sheeted to 2.5 mm. thickness or less. These sheets were then heated on perforated trays in a vacuum oven for 2 hours at 150° C. The material which was a relatively hard conversion product was solubilized by milling and dissolved in an appropriate solvent to produce the adhesive. Ten parts of zinc oxide, 30 parts of carbon black and 2 parts of an antioxidant were added during the reworking period in this case. The zinc oxide was added as soon as possible after the start of the milling to be certain that any reactive acid material that may have been present was immediately neutralized.

Example 2

| | |
|---|---|
| Rubber (pale crepe) | 100 |
| Acidified aluminum sulfate | 9 |
| Phosphorous pentoxide | 2.4 |
| Water | 1 |

These ingredients were mixed and sheeted as in Example 1. The aluminum acid sulfate and the phosphorous pentoxide are preferably added to the rubber in master batch form and the water incorporated last. The relatively thin sheets were heated for about 90 minutes at 150° C. in a vacuum oven and then masticated for about 30 minutes to render them soluble. During the mastication they were compounded with 80 parts of zinc oxide and 2 parts of an antioxidant, the zinc oxide being added as soon as possible for the above mentioned reason. The material of Example 1 was harder than that of Example 2.

If desired, other materials, such as those heretofore mentioned, may be substituted in proper combination for the aluminum sulfate and phosphorous in the above examples for the production of conversion products having desirable properties.

In the preparation of composite articles it is preferable that the metal be first coated with adhesive solution of Example 1 and, after this has dried, with a solution of the material of Example 2. Also, preferably, a further coat of a suitable tie cement is applied. The rubber to be bonded to the metal may now be applied and vulcanized directly thereto, a strong bond being produced.

The tie cement may contain a suitable amount of powdered solids such as zinc oxide, or short fibrous material such as short fiber asbestos.

The tie cement may be formed by mixing 100 parts of rubber with suitable compounding ingredients, such as about 40 parts of carbon black, 20 parts short fiber asbestos, 1.25 parts stearic acid, 5 parts zinc oxide, with or without vulcanizing agents, accelerators, and antioxidants, and dissolving the compounded rubber in suitable solvents. The tie cement is preferably prepared without accelerator so that the question of compatibility of the accelerator in the rubber compound does not need to be considered.

The drawing illustrates a composite article of rubber and metal.

The metal 1, preferably having a clean surface 2, is shown coated with adhesive films 3, 4 and 5. A rubber composition 6 is then superimposed thereon and the composite article subjected to heat and pressure under suitable conditions to vulcanize the rubber onto the coated metal.

As an example, a piece of metal 1, provided with a clean surface 2, as by sandblasting, was coated with adhesive film 3, which was applied as one or more coats of a solution of a relatively hard conversion product such as described in Example 1 above, and allowed to dry. It was then coated with film 4 which was applied as one or more coats of a solution of a softer conversion product, such as set forth in Example 2, and allowed to dry. Coating 5, which was a suitable tie cement preferably containing powdered solids such as zinc oxide or short fibrous asbestos, was then applied.

The above assembly, including a layer of vulcanizable rubber 6, was heated in a suitable mold under pressure for a sufficient time to vulcanize the rubber. Upon removal from the hot mold the bond was tested and the strength of the bond at room temperature was 775 lbs./sq. in. and at 100° C. the strength was 175 to 200 lbs./sq. in.

The suitability of an adhesive for uniting rubber to metal and the like is determined to a large extent by the plasticity of the material at elevated temperatures. The plasticity of the material may be measured by subjecting it to compression under a suitable stress such as one kilogram per square centimeter, measuring the deformation, then releasing the stress on the material and measuring its recovery. A higher ratio of recovery to deformation indicates a superior product which has less plasticity. It is customary or necessary to determine the plasticity of rubber and rubber derivatives at somewhat elevated temperatures because these materials are not very plastic at room temperature and become more plastic as the temperature is raised. A slightly elevated temperature which has been found to be satisfactory for determining plasticity is a temperature somewhat above the boiling point of water, such as 120° C. or so.

The rubber derivatives produced according to this invention, and particularly those produced when an aluminum acid sulfate and phosphorous pentoxide is used as the conversion reagent, have less deformation than rubber and are less plastic than rubber at elevated temperatures. Thus, a derivative produced with aluminum acid sulfate and $P_2O_5$, as in the above examples, gave a recovery to deformation ratio of .80 at 120° C., whereas the ratio of recovery to deformation of pale crepe rubber is but .50 under similar conditions. This characteristic is still noticeable at temperatures higher than 120° C.

When sufficiently purified the major portion of the rubber conversion products made as above set forth are hydrocarbons. They have the same unit empirical formula as rubber, namely $C_5H_8$, and as evidenced by the iodine values have less chemical unsaturation than rubber. Such conversion products are dissolved in a suitable solvent to produce adhesives suitable for bonding rubber to metal. It is preferable, however, that the solvent be one which on evaporation leaves no blisters.

In the making of adhesives according to this invention the conversion reagent is mixed into the rubber with a minimum of mastication, the reaction is carried on at a relatively low temperature, and the product is masticated only a sufficient degree to render it soluble in rubber solvents. The conversion product or the base of the adhesive thus produced is stable at normal vulcanizing temperatures, such as 270-320° F., is soluble in petroleum rubber solvents, is believed to have relatively large molecules, adheres well to rubber and gives bonds with more strength at elevated temperatures.

Since the adhesives are less thermoplastic than rubber at elevated temperatures, the adhesive may be applied in thicker coats than the very thin coat desirable to be used when a thermoplastic adhesive is used.

Bonds made between rubber and metal and between rubber and other solids with adhesives made and applied according to the present invention have relatively high strength, are relatively non-thermoplastic, and are relatively heat resistant. The method of making rubber conversion products having excellent adhesive properties has been set forth above. It is to be understood, however, that rubber conversion products which have less plasticity than crude rubber at elevated temperatures, such as 120° C., which are soluble in petroleum solvents, relatively stable at normal vulcanizing temperatures, and which have the property of forming bonds of relatively great strength between rubber and metal, may be utilized in forming the bonds of this invention.

This application is a continuation in part of my applications Serial Nos. 15,470, filed April 9, 1935, for Thermoplastic rubber and method of making the same; 78,896, filed May 9, 1936, for Adhesive and method of making the same; 78,897, filed May 9, 1936, for Composite product and method of making the same; 151,486, filed July 1, 1937, for Rubber isomer and method of making the same; and 184,241, filed January 10, 1938, for Composite product and method of making same.

Various modifications may be made in the above described process without departing from the principles of the invention herein set forth, and it is my intention not to limit the appended claims except as may be necessitated by the prior art.

What I claim is:

1. A method of making a composite article containing rubber and metal in which the rubber is firmly bonded to the metal, which comprises applying to the metal surface to be united to the rubber a solution of a hydrocarbon rubber conversion product having the same carbon to hydrogen ratio as rubber and less unsaturation than rubber, placing the coated metal surface in contact with the rubber, subjecting the rubber to heat and pressure while in contact with the coated metal surface, and removing the hot article from the hot mold with maintenance of good bond strength between the rubber and the metal, said hydrocarbon rubber conversion product being characterized by having at 120° C. a greater ratio of recovery to deformation than has crude rubber at the same temperature and by being a heat reaction product of a solid rubber mix formed in thin section and containing a reactive salt of a strong acid in water.

2. A method of making a composite article containing rubber and metal in which the rubber is firmly bonded to the metal, which comprises applying to the metal surface to be united to the rubber a solution of a hydrocarbon rubber conversion product having the same carbon to hydrogen ratio as rubber and less unsaturation than rubber, applying a curable rubber compound against said coated surface, curing the rubber against said coated surface in a mold under heat and pressure, and removing the composite article from the hot mold, said hydrocarbon rubber conversion product having at 120° C. a greater ratio of recovery to deformation than has crude rubber at the same temperature and being the heat reaction product of a solid rubber mix formed in thin section and containing a water-soluble metal sulphate, a weakly acidic substance, and water.

3. A method of making a composite article having rubber firmly bonded to metal, which comprises applying on a surface of the metal a layer of rubber conversion product being a conversion product resulting from heating in a form having thin section, less than about 5 mm. thickness, a solid mixture of rubber containing essentially a reactive salt of a strong acid and a member of the group consisting of weak acid and weak acid anhydrides; vulcanizing with the aid of heat and pressure a rubber compound in contact with the rubber conversion product and removing the article from the mold while hot, said conversion product being further characterized by having the same carbon-to-hydrogen ratio as has rubber and by having less chemical unsaturation and less plasticity at 100° C. than has rubber.

4. A method of making a composite article having rubber firmly bonded to metal, which comprises disposing over the surface of the metal a layer of a rubber conversion product resulting from the reaction in thin section of a solid rubber mix having intimately dispersed therethrough a relatively small amount of a solid water-soluble salt of a strong acid and water; applying a vulcanizable rubber compound over the coated metal; vulcanizing the rubber of said rubber compound against the conversion product with the aid of heat and pressure, and removing the article from the mold while hot, whereby a strongly bonded composite article is produced, said conversion product having the same carbon to hydrogen ratio as rubber but having less chemical unsaturation and less plasticity at 100° C. than has pale crepe rubber.

5. A method of making a composite article having rubber firmly bonded to metal, which comprises disposing over a surface of the metal a solution of the rubber conversion product, soluble in petroleum solvents for rubber, having carbon and hydrogen in substantially the same ratio as in rubber and having a finely divided, essentially non-acidic, undissolved, inorganic solid mixed therewith; vulcanizing an unvulcanized rubber compound to the coated metal in a hot mold; and removing the article from the mold while hot, whereby a strongly bonded composite article is produced, said rubber conversion product having less chemical unsaturation and less plasticity than pale crepe rubber at temperatures of the order of 100° C. and being the heat reaction product in thin section of a solid rubber mix containing a water-soluble salt of a strong acid and water.

6. A method of making a composite article having rubber firmly bonded to metal, which comprises applying on a surface of the metal a layer of rubber conversion product being a conversion product resulting from heating in a form having thin section, less than about 5 mm. thickness, a solid mixture of rubber containing essentially a reactive acid sulfate and a member of the group consisting of weak acid and weak acid anhydrides; vulcanizing with the aid of heat and pressure a rubber compound in contact with the rubber conversion product and removing the article from the mold while hot, said conversion product being further characterized by having the same carbon-to-hydrogen ratio as has rubber and by having less chemical unsaturation and less plasticity at 100° C. than has rubber.

7. A method of making a composite article having rubber firmly bonded to metal, which comprises applying on a surface of the metal a layer of rubber conversion product being a conversion product resulting from heating in a form having thin section, less than about 5 mm. thickness, a solid mixture of rubber containing essentially an aluminum acid sulfate and a member of the group consisting of weak acid and weak acid anhydrides; vulcanizing with the aid of heat and pressure a rubber compound in contact with the rubber conversion product and removing the article from the mold while hot, said conversion product being further characterized by having the same carbon-to-hydrogen ratio as has rubber and by having less chemical unsaturation and less plasticity at 100° C. than has rubber.

8. A composite article comprising rubber and metal and having the rubber firmly bonded to the metal through a rubber conversion product having the same carbon-to-hydrogen ratio as has rubber, less unsaturation than rubber and less plasticity than pale crepe rubber at a temperature of 120° C., said conversion product being a heat reaction product of a solid mix of rubber and a solid conversion agent for rubber, which mix is reacted in a section having a thickness of less than 5 mm., said agent being one capable with the aid of heat of isomerizing rubber as evidenced by the production of a hydrocarbon reaction product having less chemical unsaturation than the rubber but with the same carbon to hydrogen ratio as rubber.

9. A composite article comprising rubber and metal and having the rubber firmly bonded to the metal through a rubber conversion product having the same carbon-to-hydrogen ratio as has rubber, less unsaturation than rubber and less plasticity than pale crepe rubber at a temperature of 120° C., said conversion product being a heat reaction product of a solid mix of rubber containing essentially a water-soluble salt of a strong acid and a weakly acidic substance, which mix is reacted in a form having a thin section.

10. A composite article comprising rubber and metal and having the rubber firmly bonded to the metal through a rubber conversion product having the same carbon-to-hydrogen ratio as has rubber, less unsaturation than rubber and less plasticity than pale crepe rubber at a temperature of 120° C., said conversion product being a heat reaction product of a solid mix of rubber containing a solid water-soluble salt of a strong acid, water and a member of the group consisting of weak acids and weak acid anhydrides, which mix is reacted in a form having a thin section of not more than 5 mm.

11. A composite article comprising rubber and metal and having the rubber firmly bonded to the metal through a rubber conversion product having the same carbon-to-hydrogen ratio as has rubber, less unsaturation than rubber and less plasticity than pale crepe rubber at a temperature of 120° C., said conversion product being a heat reaction product of a solid mix of rubber containing water-soluble acid sulfate, water and a member of the group consisting of weak acids and weak acid anhydrides, which mix is reacted in a form having a thin section of not more than 5 mm.

12. A composite article comprising rubber and metal and having the rubber firmly bonded to the metal through a rubber conversion product having the same carbon-to-hydrogen ratio as has rubber, less unsaturation than rubber and less plasticity than pale crepe rubber at a temperature of 120° C., said conversion product being a heat reaction product of a solid mix of rubber containing aluminum acid sulfate and phosphoric acid, which mix is reacted in a form having a thin section of not more than 5 mm.

13. A method of making a composite article having rubber firmly bonded to metal which comprises applying on the surface of the metal a layer of a rubber derivative having the same carbon-to-hydrogen ratio as rubber, less unsaturation than rubber and less plasticity than pale crepe rubber at temperatures of the order of 100° C.; vulcanizing with the aid of heat and pressure a rubber compound in contact with said layer of rubber derivative, and removing the article from the mold while hot, said rubber derivative, being further characterized by being soluble in petroleum solvents for rubber and by being a masticated heat reaction product prepared by heating, in a form having a section of less than 5 mm.'s thickness and in an atmosphere having less oxygen pressure than the partial pressure of oxygen in the atmosphere, a solid mixture of rubber and solid rubber conversion reagent.

14. A composite article comprising rubber and metal and having the rubber firmly bonded to the metal through an unmelted rubber derivative having the same carbon-to-hydrogen ratio as rubber, less unsaturation than rubber and less plasticity than pale crepe rubber at a temperature of 120° C., said rubber derivative being soluble in petroleum solvents for rubber, being a masticated exothermal reaction product prepared by heating in a form having a section of less than 5 mm.'s thickness, and in an atmosphere having less oxygen pressure than the partial pressure of oxygen in the atmosphere, a solid mixture of rubber and solid rubber conversion reagent.

THOMAS RAYMOND GRIFFITH.